(12) United States Patent
Liedtke et al.

(10) Patent No.: US 6,366,232 B1
(45) Date of Patent: Apr. 2, 2002

(54) METHOD AND SENSOR FOR DETECTING FOREIGN BODIES IN A MEDIUM WITH A RADAR

(75) Inventors: Stefan Liedtke, Rankweil; Stefan Tichy, Vienna, both of (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/414,193

(22) Filed: Oct. 7, 1999

(30) Foreign Application Priority Data

Oct. 15, 1998 (DE) ........................................ 198 47 688

(51) Int. Cl.$^7$ ............................ G01S 13/88; G01V 3/12
(52) U.S. Cl. .......................................... 342/22; 342/196
(58) Field of Search ............................ 342/22, 90, 188, 342/189, 195, 196

(56) References Cited

U.S. PATENT DOCUMENTS

| | | | | |
|---|---|---|---|---|
| 4,896,116 A | * | 1/1990 | Nagashima et al. | 324/329 |
| 4,901,080 A | | 2/1990 | McHenry | 342/1 |
| 4,922,467 A | * | 5/1990 | Caulfield | 367/87 |
| 5,512,834 A | | 4/1996 | McEwan | 324/642 |
| 5,541,605 A | | 7/1996 | Heger | 342/85 |
| 5,543,799 A | | 8/1996 | Heger | 342/85 |
| 5,592,170 A | * | 1/1997 | Price et al. | 342/22 |
| 5,867,117 A | * | 2/1999 | Gogineni et al. | 342/22 |
| 5,910,787 A | | 6/1999 | Berg et al. | 342/165 |
| 5,936,568 A | | 8/1999 | Berg et al. | 342/1 |
| 5,974,881 A | * | 11/1999 | Donskoy et al. | 73/579 |
| 6,008,753 A | | 12/1999 | Berg et al. | 342/165 |

FOREIGN PATENT DOCUMENTS

| | | |
|---|---|---|
| DE | 19515666 A1 | 10/1996 |
| GB | 2344810 | 6/2000 |
| WO | 9801770 | 1/1998 |

OTHER PUBLICATIONS

D.J. Daniels, Surface Penetration Radar, ECE—Journal, Aug., 1996, pp. 165–182.

K.D. Kammeyer et al., Digitale Signalverarbeitung, B.G. Teuber, Stuttgart, 1998, pp. 323–326.

J. Hugenschmid, Georarar in Strassenbau und Unterhald, EMPA—Report (113/10), No. FE 160, 617, pp. 9/33–11/93.

J.S. Padaratz et al, Coupling Effects of Radar Antenna on Concrete, NDT CE 97, v. 1 pp. 237–245.

D.E. Newland, An Introduction to Random Vibrations, Spectral and Wavelet Analysis, Longman Group, G.B. Reprint 1995, Chapter 17, pp. 294–300.

* cited by examiner

Primary Examiner—John B. Sotomayor
(74) Attorney, Agent, or Firm—Sidley Austin Brwon & Wood, LLP

(57) ABSTRACT

A method of detecting foreign bodies in a medium with a radar having a transceiver, and including emitting a radar wave through a wall surface into the medium with the transceiver, detecting a radar signal reflected in the medium, pre-processing the reflected radar signal and subjecting the pre-processed radar signal to evaluation and assessment, determining a characteristic of a foreign body at a stationary position of the transceiver with an algorithm which is based on a pre-processed, digitalized receivable signal, which characteristic permits to recognize differences between a shape of the reflected radar signal and stored comparison values, and conducting a comparison assessment of the shape differences of the reflected signal against predetermined threshold values.

14 Claims, 7 Drawing Sheets

METHOD AND SENSOR FOR DETECTING FOREIGN BODIES IN A MEDIUM WITH A RADAR

BACKGROUND OF THE INVENTION

1. Field of the Invention

The present invention relates to a method for detecting foreign bodies in a medium with a radar and which includes emitting a radar wave with a transceiver into the medium, detecting the signal reflected in the medium, pre-processing the reflected signal, and subjecting the pre-processed signal to evaluation and assessment. The present invention also relates to the use of the inventive method in an electromagnetic or position sensor for detecting foreign bodies in a medium.

2. Description of the Prior Art

Radars, in particular ground radars, are used in geodesic works for a long time. For the first time, the use of a radar principle for detecting metal, plastic parts and other foreign bodies in a wall was described in the publication of D. J. Daniels, Surface-Penetrating Radar, IEE-Press, London, 1996 Daniels. At present, all available on the market radars are based on so-called image bending method which supply to a user "images" of the obtained measurement data. The conventional radar apparatuses are expensive, relatively large, and are hardly usable under "smoked" everyday conditions prevailing at a constructional site. In order to obtain the image data, a manually or mechanically controlled scanning process, i.e., movement of the antenna unit is necessary for collecting a large amount of data. U.S. Pat. Nos. 5,541,605 and 5,543,799 disclose comparatively small radars for detecting foreign bodies in walls. However, the data obtained during the scanning process with these radars are not use or are not used in optimal manner. U.S. Pat. No. 5,512,834 discloses a relatively small electromagnetic sensor for detecting presence of metallic and non-metallic objects in the walls. However, the signal evaluation is effected only with respect to certain predetermined level parameters.

The functional principle of a impulse radar which, together with a stepped frequency radar, is of a primary interest here, can be explained with reference to FIG. 3. With a clock high-frequency generator 1, a very short pulse having a length or duration less than 1 ns is generated. This pulse is emitted by an antenna 2 as an electromagnetic wave into an examined medium (e.g., concrete). At the locations where the permittivity changes, e.g., in transition areas concrete/reinforcing metal, concrete/plastic pipe, the electromagnetic wave(s) is (are) reflected. This reflection is detected by the second antenna 3. The reflected signal is amplified by a high-frequency amplifier 4 which is controlled by a scanning control unit 7 in a time-dependent manner. The amplified signal is communicated to a band-limiting unit 8 and then to a scan H-circuit 5. Finally, the signal is digitalized by an A/D converter 6 and communicated to signal processing means. The entire signal pre-processing equipment or at least the transmitting and receiving antennas 2 and 3 are located in a common housing which can be easily handled. The antennas 2 and 3 are displaced across the examined medium, and the propagation, together with the amplitude of the reflection signal are plotted graphically dependent on a scanning position (see J. Hugenschmid, "Georadar in Strassenbau und Unterhalt (Geodsic Radar in Road Construction and Maintenance), "an extract from EMPA-Report (113/10), No. FE160,617, pp. 9/93–11/93). A technician is only in a position to make a conclusion, based on the obtained diagram or images, whether foreign bodies are present in the examined medium. For further details, please refer to Daniels.

The main difficulty of using such radar apparatuses consists in that the scanning process need be continuously conducted over a large surface area in order to find out at which points the reflection signal are generated due to the presence of foreign bodies. For the interpretation of the obtained "images", experience and technical knowledge are necessary. Besides, the conventional radars, as it has already been mentioned above, are large and expensive.

Accordingly an object of the present invention is to provide an improved method for detecting positions of metal, plastic and/or other foreign bodies enclosed in media such as concrete, brick, gypsum, plaster, wood, and the like and in surrounding media such as air, gas or liquid.

Another object of the present invention is to provide detecting apparatus based on the improved detecting method.

A further object of the present invention is to provide an improved method for detecting positions of metal, plastic and/or other foreign bodies enclosed in media such as concrete, brick, gypsum, plaster, wood, and the like and in surrounding media such as air, gas or liquid, with which a continuous displacement of the antenna unit across the examined surface becomes unnecessary.

SUMMARY OF THE INVENTION

These and other objects of the present invention, which will become apparent hereinafter, are achieved by providing a method for detecting foreign bodies which includes determining a characteristic of a foreign body at a stationary position of the transceiver with an algorithm which is based on a pre-processed, digitalized receivable signal, which characteristic permits to recognize differences between a shape of the reflected radar signal and stored comparison values, and conducting a comparison assessment of the shape differences of the reflected signal against predetermined threshold values, whereby a position of the foreign body is determined.

The present invention is based on a concept, in particular when an impulse radar is used, on exciting the transmitting antenna with very short pulses to obtain an electromagnetic wave with different amplitudes and frequencies which can be emitted in different directions. When a reflection from a foreign body takes place at a predetermined angle with respect to the transceiver antenna, the reflection signal has a shape different from a shape of a reflection signal obtained directly beneath the antenna. The method of signal processing according to the present invention, which will be describe in detail further below, permits to distinguish between these two signals due to their different amplitudes and/or frequencies.

For achieving even better signal/noise ratios, advantageously, a stepped-frequency radar can be used.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
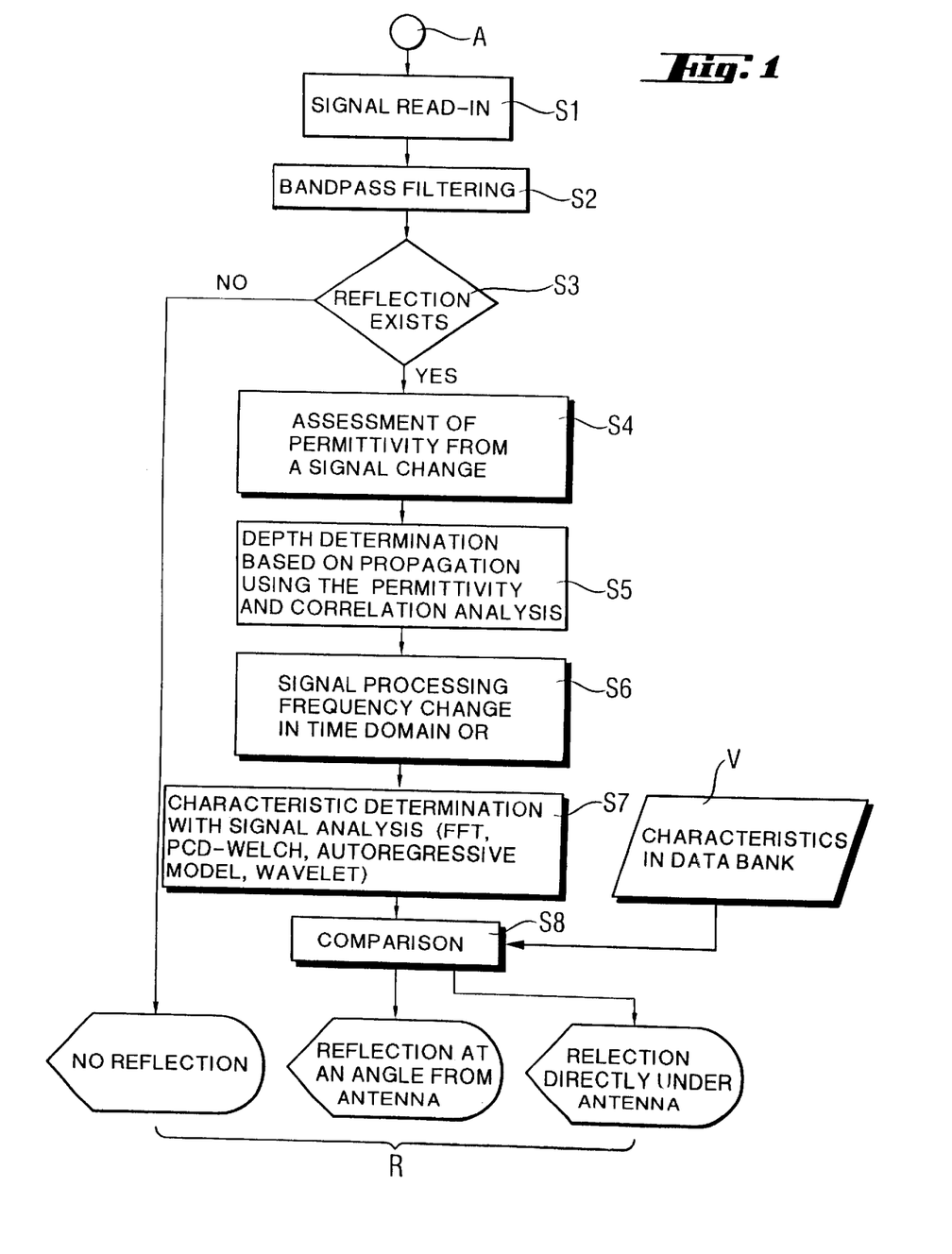
FIG. 1 a flow chart for processing a signal according to the present invention, with the steps particularly relevant for the present invention being marked with dark shadowy edges.
Figure 3:
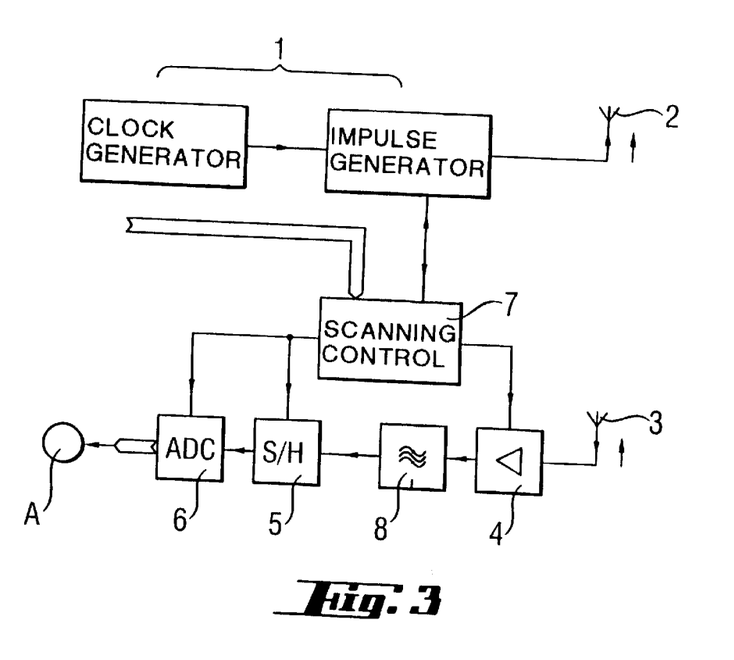
FIG. 3 a principal schema of a hardware of an impulse radar apparatus for discovering foreign bodies in media.

The flow chart, which is shown in FIG. 1, illustrates the processing of a pre-processed signal emitted at a data output A in FIG. 3. After reading-in of the signal in step 1 and digital band-pass filtration in step 2, it is determined in step 3 whether a significant reflection is present. Optionally, however, as a rule, always in step 4, an approximate assessment of specific characteristics of a tested medium, in particular of a (relative) permittivity $\epsilon r$, takes place.

Generally, the value of $\epsilon r$ in a moist brickwork or concrete is substantially higher than in dry media of the type discussed here. The basis concept of determining the value of $\epsilon r$ by changes of a frequency spectrum is disclosed in a report of I. J. Padaratz et al., "Coupling Effects of Radar Antenna on Concrete," published in proceedings of conference "Non-Destructive Testing in Civil Engineering," NDT-CE 97, vol. 1, p.p. 237–245.

After $\epsilon r$ has been determined, in step 5, by using a correlation analysis, an assessment of the depth of the reflection signal based on the determination of the signal propagation by an equation.

$$V = \frac{C}{\sqrt{\epsilon_r}},$$

where c—the velocity of light, and $\epsilon r$—the earlier determined permittivity takes place.

In step 6, the signal processing in the time slot (domain) or in the frequency domain, which will be explained in more detail below, takes place, with a subsequent determination of specific characteristics, by using a special signal analysis, in step 7. Finally, in step 8, a comparison of the results of the signal analysis with the stored characteristics (comparison value v) takes place, with the stored characteristic being preliminary determined in a stationary scanning position. The comparison furnishes information as to whether the foreign body is located beneath the antenna, i.e., e.g., in a forbidden position, in which a rupture in a wall may occur, or is spaced from the antenna at a more or less large angle.

Below, two signal processing methods, which are possible within the scope of the present invention, will be discussed.

Signal Processing With An Aid of Fourier Transformation (Welch Method)

Figure 4:
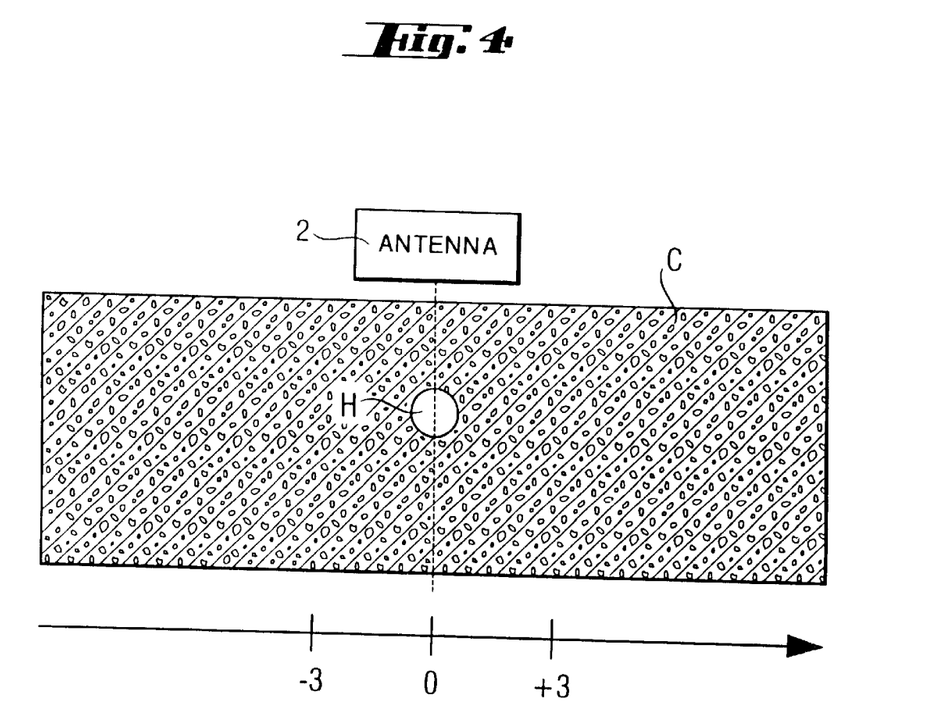
FIG. 4 a principle schema illustrating positioning of a transceiver (antenna) in a "0" scanning position for obtaining to be stored comparison values (reference scanning)
Figure 5:
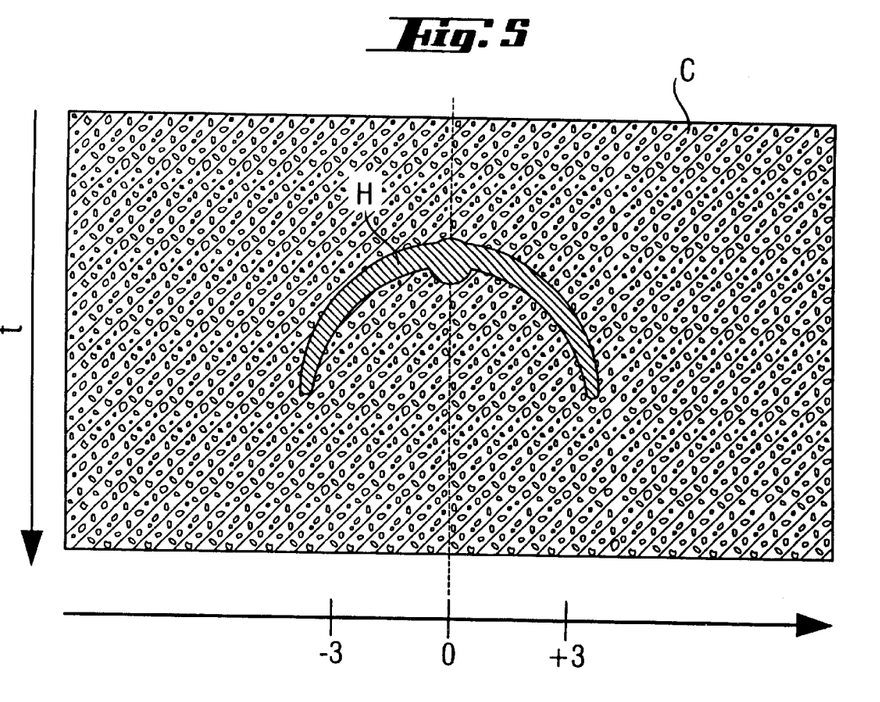
FIG. 5 a principle schema similar to that of FIG. 4 but with different positions of a foreign body.
Figure 6:
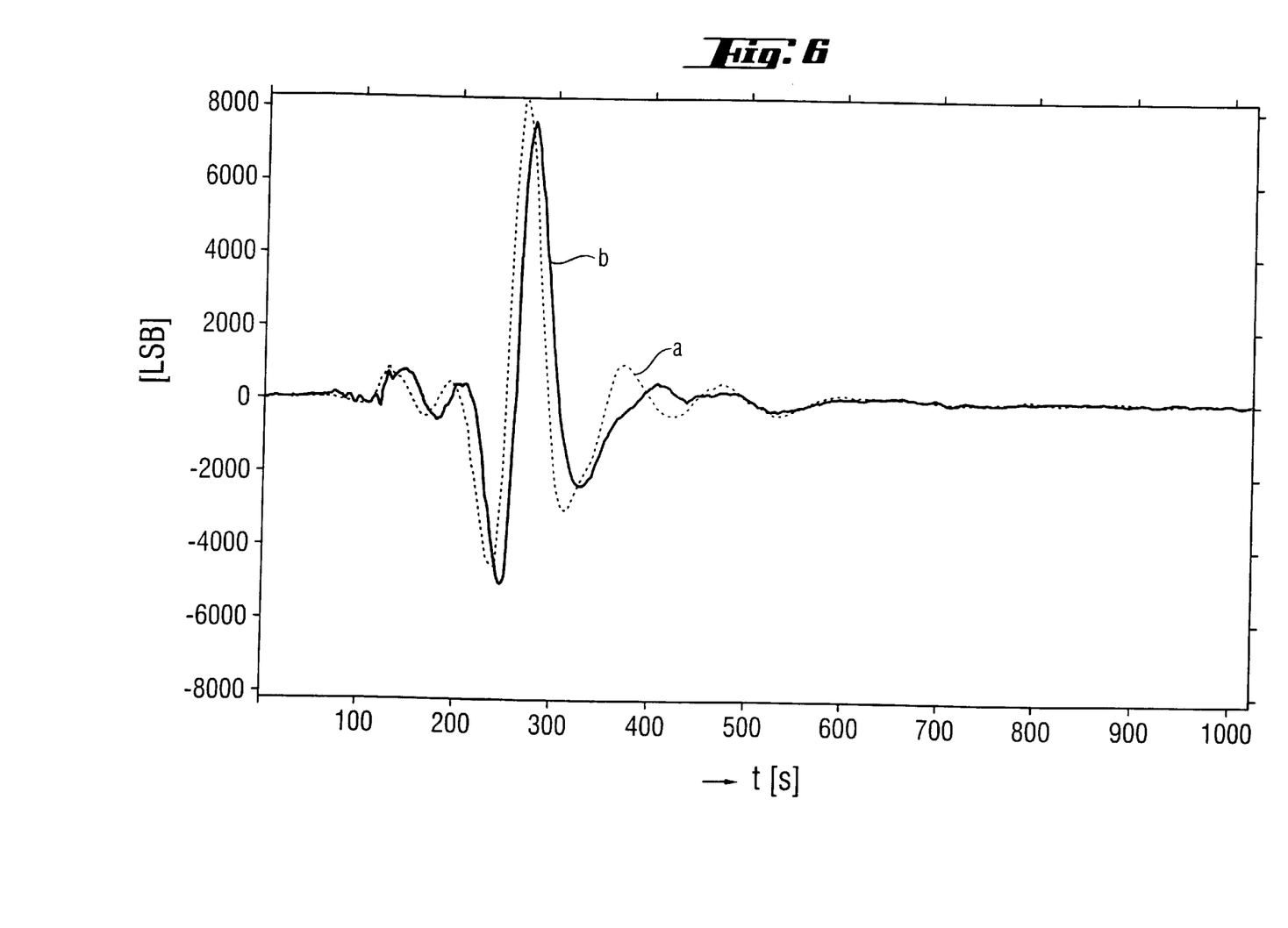
FIG. 6 a diagram illustrating two reflection signals in a time slot.
Figure 7:
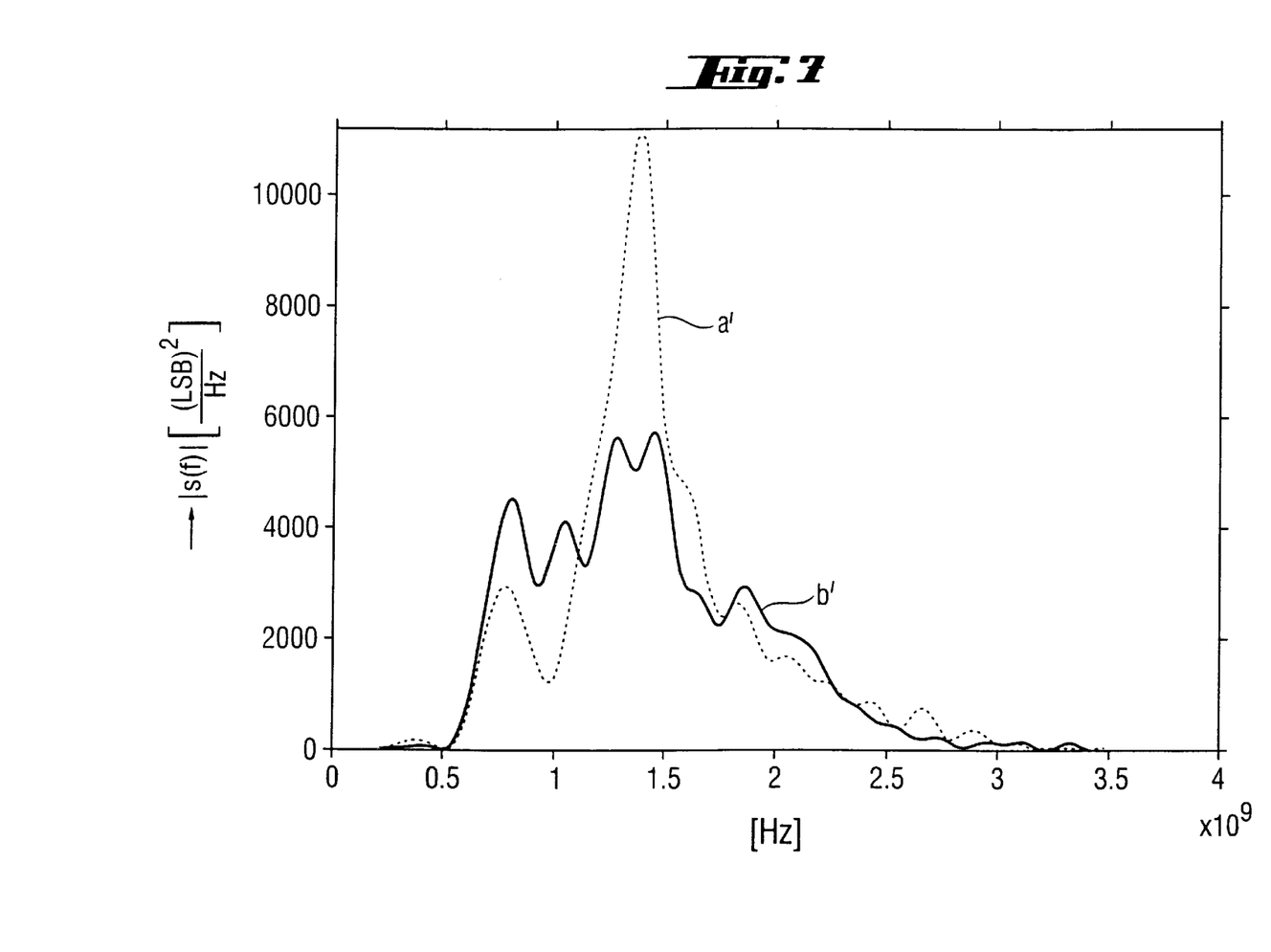
FIG. 7 a diagram illustrating the signals shown in FIG. 6 but in a frequency domain.

In an antenna "0" scanning position (compare FIGS. 4 and 5), a reference scanning for different reinforcing metals, plastic pipes and the like is effected. In the discussed example, the scanning period contain 1024 scanning points. The duration of the scanning period amounts to, e.g., from 2 ns to 20 ns. The curve "a" in FIG. 6 shows the results of the reference scanning. By a frequency analysis, by using specifically the Welch method (see K. D. Kammeyer and K. Kroschel, Digital Processing, B. G. Teubner, Stuttgart, 1998, p.p. 323–326 (Kammeyer)) the power spectral density (LSD) of the signal in the frequency region is detected (see curve "a" in FIG. 7) and the LSDs are stored as reference spectra. From the reference spectra, a mean spectrum is determined. On the ordinate in FIG. 6, the number of observed digital values (samples) is plotted. In the discussed, example, there are 1024 samples which correspond to a scanning period of 12 ns. On the absciss, the signal strength in LSD is plotted, whereby the value of a unit corresponds to the complete range of the variable under consideration (e.g., voltage or current/divided by $2^n$, where n is resolution of the A/D converter.

Then, a measurement in any arbitrary position of the wall can be effected with this scanning. Likewise the power spectral densities are determined by 1024 separate values, with the Welch method being used again. The employed method should be identical to the method employed in the first step during reference scanning.

Figure 8:
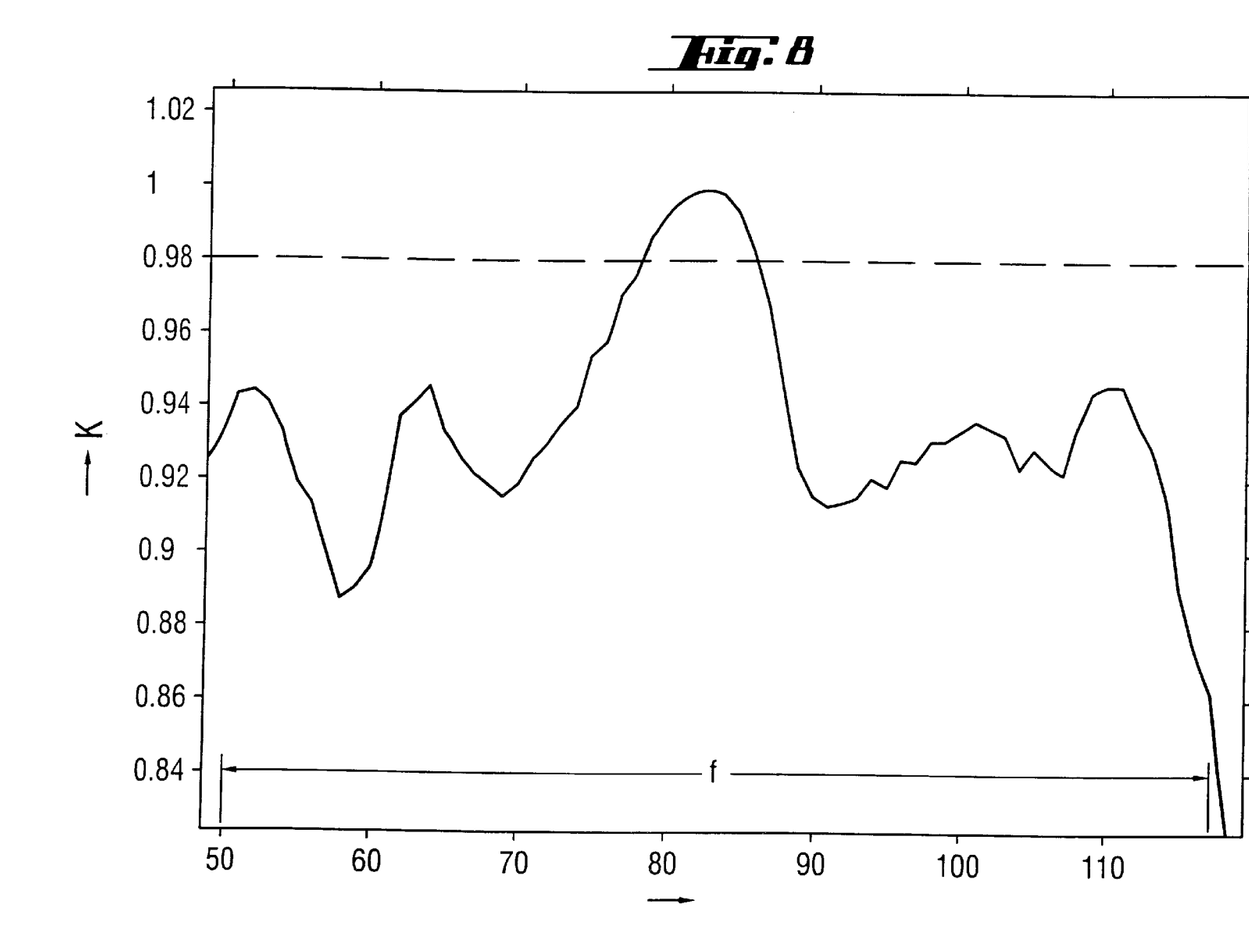
FIG. 8 a diagram illustrating the results of a correlation analysis of the two curves shown in FIGS. 6 and 7 with reference to a scanning window within which a to-be-detected foreign body is detected.

The amplitude spectrum of a signal of a measurement is compared, only by a correlation analysis in the steps S7 and S8, with the stored reference spectrum obtained in the "0" scanning position. The actual measurement can be taken, e.g., in the "+3" scanning position (see FIGS. 4 and 5). Finally, the value, which is obtained by the correlation analysis, is assessed against a threshold value which in FIG. 8 is equal, e.g., to 0.98. When the correlation coefficient K exceeds this value, the foreign body is located within an unacceptable angular region. When the correlation coefficient K is below the threshold value, the antenna is not located above a foreign body H.

Signal Processing With An Aid of Autoregressive Model (AR-Model)

Based on a signal of a scanning process in a time domain, an autoregressive model (AR-model), which belongs to a method of a parametric spectral evaluation, $$H(z) = \frac{1}{A(z)} = \frac{1}{1 + \sum_{v=1}^{n} a_v \cdot z^{-v}} \quad (1)$$

is formed. The obtained coefficients $\alpha v$ lead (in (1)) to the poles of the function H(z) in the z-plane (transformed representation of the digital signal). This poles are represented by $$S = \frac{\ln(z)}{\pi}$$

in the s-plane with $\alpha = \sigma + \omega$ as a Fourier- or Laplace- transformed representation of the analog signal. With this representation, based on different attenuation $\sigma$ and frequency ω of separate pole points, it can be determined whether a foreign body is located beneath the antenna or not. In addition, it can be clearly determined of what material the foreign body is made.

Figure 2:
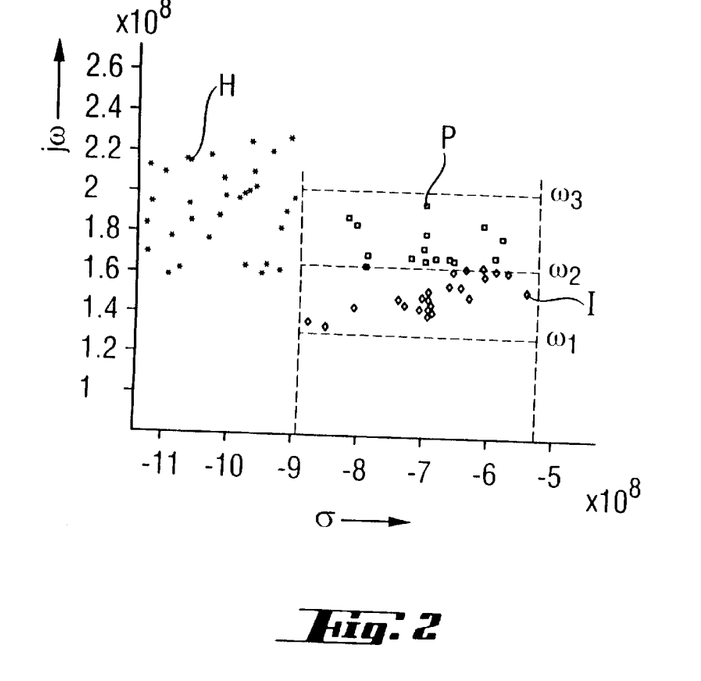
FIG. 2 a diagram illustrating the results of signal evaluation when a particular signal processing altgorithm is used.

In the representation of the s-plane in FIG. 2, pole points of a plurality of reflections from reinforcing metal I, the reflections of plastic pipes P, and the reflections of foreign bodies H which lie at a predetermined angle to the center of the antenna, are shown, respectively, with small rhombuses, small squares, and star points. The diagram shows that the reinforcing metal reflections I are located, as a result of attenuation in the region $\sigma_1-\sigma_2$, in the frequency region $\omega_1-\omega_2$, the plastic pipe reflections P are located, as a result of attenuation in the region $\sigma_1-\sigma_2$, in the frequency region $\omega_1-\omega_3$. Points in which such reflections are absent, are detected by an attenuation smaller than $\sigma_2$. The difference between the reflections of different type (metal, plastic) will be observed more clearly when the measurements are taken with different antennas polarizations, in particular, when the antennas are pivoted relative to each other by an angle of 90°. However, for determination at what angle and in which direction a foreign body or bodies lie beneath the antenna, the use of a singularly polarized antenna would suffice.

For digital signal processing based on an AR-model, the reference again is made to Kammeyer. Dependent on the application, both above-described methods for assessment of a spectrum of time-discrete signal provide good results at a small amount of data.

With the Welch method, a discrete signal is parsed in the time domain in overlapping each other subdomains. These subdomains are assessed with a window function, and a respective periodogram is determined. The Welch assessed value of a spectral power density is obtained form a mean value of the subperiodogram.

The advantage of the Welch method, which is based on the Fourier transform, consists in the overlapping of subsequences assessed with a window function, as a result of which, the required number of data is substantially reduced. Further, a targeted selection of the length of separate subsequences and the degree of overlapping permits to influence resolution so method permits to achieve, in addition, the comparison with conventional periodgrams (LSD without windowing and overlapping) a higher frequency resolution.

With the use of an AR-model for spectrum assessing, a parameter αv is determined from a discrete signal in a time domain with a recursive differential equation, from which parameter, the poles of the filter characteristic function in the equation (1) is determined and can be assessed in the s-plane. AR-models are, thus, very much suitable for extracting dominant separate frequencies of a signal of a large band width.

The methods of spectral assessment, which are based on parametric models, have an advantage of providing a very good frequency resolution even with a very small amount of data.

Signal Processing with a Wavelet Analysis

The Wavelet analysis is based on a concept of imaging of a signal in a three-dimensional, time/scale/amplitude system of coordinates. The advantage of this method consists in that the "window function" is adapted to the examined frequency, i.e., wider windows are used for lower frequencies, and smaller windows for higher frequencies. For further particularities of the spectral assessment with a Wavelet analysis, one should refer to the publication of D. E. Newland, An Introduction to Random Vibrations Spectral and Wavelet Analysis, longman Group Ltd., Great Britain. Reprint 1995, Chapter 17, Discrete Wavelet Analyses, p.p. 294–300.

A further improvement of the analysis of the radar measurement data becomes possible by combination of the three above-discussed methods.

The above-described signal processing methods are suitable not only for impulse radars, which are of a primary interest in this case, but also for other types of radars, e.g., when a stepped frequency radar is used, the advantage of which is a better signal/noise ratio.

In order to achieve a better signal/noise ratio which can be of an advantage, in particular, during the analysis of deeper located foreign bodies, upon the use of the present invention, conducting of several measurements (e.g., 128 measurements) per measurement position with subsequent averaging of the signal before its further processing, is contemplated.

The present invention permits to create radar-based method for reliable detection of metallic and non-metallic objects in different media, in particular in walls and the like, which can be realized in detectors for detecting foreign bodies cost-effectively and having small dimensions and which, at the same time, are used and do not require special knowledge for their use.

Though the present invention has been shown and described with reference to a preferred embodiment, such is merely illustrative of the present invention and is not to be construed as a limitation thereof, and the present invention includes all modifications, variations and/or alternate embodiments within the spirit and scope of the present invention as defined by the appended claims.

What is claimed is:

1. A method of detecting foreign bodies in a medium with a radar having a transceiver, the method comprising the steps of emitting a radar wave by a transmitter antenna of the transceiver in different directions and with different frequencies through a wall surface into the medium, with the transceiver occupying a stationary position; detecting a radar signal reflected in the medium with the transceiver; pre-processing and digitizing the reflected radar signal and subjecting the reflected radar signal to evaluation and assessment for determining differences between a shape of the reflected and pre-processed radar signal and stored comparison values corresponding to a reference position of the transceiver with respect to off-positions angles of a foreign body in relation to a central emission direction of the transceiver; and determining a characteristic of the foreign body with an algorithm adapted for processing the pre-processed and digitized reflected radar signal, whereby a position of the foreign body is determined.

2. A method as set forth in claim 1, wherein the signal processing includes scanning in a scanning process a plurality of scanning points which timely follow one another in a time domain and which provide spectral power densities, analyzing the spectral power densities against a stored reference spectrum by using a method of a correlation analysis, and comparing an obtained correlation value with a predetermined correlation coefficient.

3. A method as set forth in claim 1, wherein the radar wave emitting step includes emitting a plurality of radar waves with differently polarized antennas of the transceiver.

4. A method as set froth in claim 3, wherein antenna polarizations are displaced relative to each other by an angle of 90°.

5. A method as set forth in claim 1, wherein the signal processing is effected with a Welch algorithm.

6. A method as set forth in claim 1, wherein the signal processing for determining the position of the foreign body is effected with an algorithm based on autoregressive model with a transformed presentation in one of z- and s-planes, determination of pole points, and comparison of at least one of attenuation (σ) and frequency (ω) of the pole points with a stored value.

7. A method as set forth in claim 1, wherein the signal processing is effected with an algorithm based on a Wavelet signal analysis.

8. A method as set forth in claim 1, including the steps of determining permittivity of the medium, and determining a depth, at which the foreign body is located based on the determination of a reflection layer, use of the obtained permittivity, and analysis of a signal propagation by using a correlation analysis.

9. A method as set forth in claim 1, comprising the steps of conducting a plurality of scanning processes at a measurement position, and processing the obtained reflection signals, whereby an improved signal/noise ratio is obtained for the reflection signals for which evaluation is conducted.

10. A method as set forth in claim 9, comprising the steps of effecting at least one of depth-dependent amplification, windowing, and filtering of the scanning signals on which signal evaluation is based.

11. A method as set forth in claim 1, wherein one of impulse radar and stepped frequency radar is used.

12. A method of detecting foreign bodies in a solid medium selected from a group consisting of concrete, brickwork, gypsum, plaster, and wood with a radar having a transceiver, the method comprising the steps of emitting a radar wave by a transmitter antenna of the transceiver in different directions and with different frequencies through a wall survale into the medium, with the transceiver occupying a stationary position; detecting a radar signal reflected in the medium with the transceiver; pre-processing and digitizing the reflected radar signal and subjecting the reflected radar signal to evaluation and assessment for determining differences between a shape of the reflected and pre-processed radar signal and stored comparison values of pattern signals, the stored comparison values corresponding to a reference position of the transceiver with respect to off-position angles of a foreign body in relation to a central emission direction of the transceiver; and determining a characteristic of the foreign body with an algorithm adapted for processing the pre-processed and digitalized reflected radar signal, whereby a position of the foreign body is determined.

13. A method of detecting foreign bodies in a solid medium with an electromagnetic sensor an operation of which is based on a process including the steps of emitting a radar wave by a transmitter antenna of the transceiver indifferent directions and with different frequencies through a wall surface into the medium, with the transceiver occupying a stationary position; detecting a radar signal reflected in the medium with the transceiver; pre-processing and digitizing the reflected radar signal and subjecting the reflected radar signal to evaluation and assessment for determining differences between a shape of the reflected and pre-processed radar signal and stored comparison values of pattern signals, the stored comparison values corresponding to a reference position of the transceiver with respect to off-positions angles of a foreign body in relation to a central emission direction of the transceiver; and determining a characteristic of the foreign body with an algorithm adapted for processing the pre-processed and digitalized reflected radar signal, whereby a position of the foreign body is determined.

14. A method of detecting foreign bodies in a solid medium with a position sensor an operation of which is based on a process including the steps of emitting a radar wave by a transmitter antenna of the transceiver in different directions and with different frequencies through a wall surface into the medium, with the transceiver occupying a stationary position; detecting a radar signal reflected in the medium with the transceiver; pre-processing and digitizing the reflected radar signal and subjecting the reflected radar signal to evaluation and assessment for determining differences between a shape of the reflected and pre-processed radar signal and stored comparison values of pattern signals, the stored comparison values corresponding to a reference position of the transceiver with respect to off-positions angles of a foreign body in relation to a central emission direction of the transceiver; and determining a characteristic of the foreign body with an algorithm adapted for processing the pre-processed and digitalized reflected radar signal, whereby a position of the foreign body is determined.

* * * * *